United States Patent [19]
Frost et al.

[11] Patent Number: 5,993,880
[45] Date of Patent: Nov. 30, 1999

[54] NON-STAINING, ACID-STABLE, COLD-WATER-SOLUBLE, EDIBLE GREEN COLOR AND COMPOSITIONS FOR PREPARING ACIDIC FOODS AND BEVERAGES

[75] Inventors: John R. Frost, New Windsor; Fouad Z. Saleeb, Pleasantville, both of N.Y.

[73] Assignee: Kraft Foods Inc., Northfield, Ill.

[21] Appl. No.: 09/164,668

[22] Filed: Oct. 1, 1998

[51] Int. Cl.⁶ .............................. C09B 67/08; A23L 1/27
[52] U.S. Cl. .................. 426/540; 8/552; 8/646; 426/268
[58] Field of Search ............... 8/538, 552, 624, 8/646; 426/250, 268, 540

[56] References Cited

U.S. PATENT DOCUMENTS

| | | | |
|---|---|---|---|
| 4,187,320 | 2/1980 | Koch et al. | 426/3 |
| 4,797,392 | 1/1989 | Chernomorsky | 514/185 |
| 4,952,392 | 8/1990 | Thame | 424/58 |
| 5,112,600 | 5/1992 | Jackson et al. | 424/55 |
| 5,209,978 | 5/1993 | Kosaka et al. | 428/402.2 |
| 5,709,873 | 1/1998 | Bar-Shalom et al. | 424/422 |

FOREIGN PATENT DOCUMENTS

| | | |
|---|---|---|
| 55-161863 | 12/1980 | Japan . |
| 06-217718 | 8/1994 | Japan . |

OTHER PUBLICATIONS

O. Fennema, *Food Chemistry*, 3rd Edition, Marcel Dekker, Inc., pp. 651–653, 671, 711, 720, 1996.

*Primary Examiner*—Keith Hendricks
*Attorney, Agent, or Firm*—Thomas R. Savoie; Thomas A. Maroux

[57] ABSTRACT

A new form of green color is prepared by specially treating copper chlorophyllin to make it acid-stable and cold-water-soluble. The new composition has a unique combination of properties makes it especially suitable for use in dry mix compositions for preparing acidic beverages and foods such as gelatin desserts. The dry, water-soluble, acid-stable green coloring composition contains copper chlorophyllin, a solid fixative and a hydrophilic surfactant. The weight ratio of the copper chlorophyllin to the hydrophilic surfactant is in the range of from about 1:1 to 1:6. For beverages and gelatin dessert mixes, flavor and sufficient acid are employed to achieve a pH of less than 4 when the dry mix composition is mixed with water.

17 Claims, No Drawings

NON-STAINING, ACID-STABLE, COLD-WATER-SOLUBLE, EDIBLE GREEN COLOR AND COMPOSITIONS FOR PREPARING ACIDIC FOODS AND BEVERAGES

TECHNICAL FIELD

The invention relates to a new form of green color and methods of making and using it. The new color is prepared by specially treating copper chlorophyllin to make it acid-stable and cold-water-soluble. The new compositions and their unique combination of properties makes them especially suitable for use in dry mix compositions for preparing acidic beverages and foods such as gelatin desserts.

Foods are dropped or spilled all too often. To compound the problem, stains remain even after the food is essentially completely cleaned up. In the case of aqueous foods and beverages, the problem often lies with the dies or other colorants used to provide the desired visual appeal. For most colors used in foods, it is possible to find an edible colorant that doesn't stain. This is not the case, however, for the color green, especially in a form suitable for use in dry mixes for preparing acid beverages and gelatin dessert mixes. None of the available forms of green color meet the relatively complex set or criteria for these products.

The art is in need of an effective solution to this problem.

BACKGROUND ART

The selection of a green colorant for foods leaves one with limited choices. One can either use an FD&C color or chlorophyll. Unfortunately, the FD&C color stains carpets and fabric heavily and irreversibly. And, the color imparted by chlorophyll changes to an unappetizing "khaki" green under acid conditions. The same is true of various chlorophyll derivatives such as copper chlorophyllin.

Chlorophyllin is an umbrella term that includes several breakdown products of chlorophyll saponification with either sodium or potassium hydroxide, resulting in sodium chlorophyllin or potassium chlorophyllin.

These compounds have the advantage over chlorophyll in that they are water soluble. Unfortunately, the molecule includes a magnesium atom which is easily removed at low pH, causing the color to turn brownish.

The color of chlorophyllin can be made more acceptable by subjecting it to a strong mineral acid treatment to strip out the magnesium and replace it with copper. The resulting copper chlorophyllin has a green hue and is stable at low pH. Unfortunately it precipitates out of solution under acid conditions.

Copper chlorophyllin is known to be available in two commercial forms. One (sold by Dr. Marcus, GmbH) is an acid-stable liquid comprised of 3% copper chlorophyllin, 24% polysorbate 80 and 73% water. The solution has an alkaline pH at which solubility is not a problem. The other (sold by Meer Corp.) is a powder of 100% copper chlorophyllin.

In U.S. Pat. No. 4,187,320, Koch, et al., identify copper chlorophyllin as a pigment useful in chewing gum bases. The form of the pigment is not mentioned. The pH is not disclosed, but it would seem to be alkaline due to the presence of filler materials such as calcium carbonate, and the like.

In U.S. Pat. No. 5,112,600, Jackson, et al., describe an anti-caries composition containing a source of hydrogen citrate ions and having a pH of from 4 to 7. Among the additives are "chlorophyll compounds (e.g., sodium copper chlorophyllin)". Again, the physical form is not identified. Moreover, the purpose of adding the sodium copper chlorophyllin is apparently for purposes other than color and no example of its use in liquid form is given.

Similarly, in U.S. Pat. No. 5,709,873, Bar-Shalom, et al., disclose dental compositions in which copper chlorophyllin is listed as a source of chlorophyll. Again, the purpose does not appear to be for color, and no detail is provided of a specific application.

In U.S. Pat. No. 5,209,978, Kosaka, et al., list copper chlorophyllin as one of several dyes suitable for coloring gelatin capsules. No pH or physical form information are given.

There remains a need for an acid-stable and cold-water-soluble form of green color based on non-staining copper chlorophyllin. The new compositions should be in the form of dry, free-flowing powders that wet easily and dissolve rapidly and completely in aqueous liquids having acid pH values suitable for fruity-flavored beverages and foods such as gelatin desserts.

DISCLOSURE OF THE INVENTION

It is an object of the invention to provide a dry, water-soluble green coloring composition, which is stable in low pH aqueous foods.

It is an object of the invention to provide a method for making a dry, water-soluble green coloring composition, which is stable in low pH aqueous foods.

It is an object of the invention to provide a new, dry form of copper chlorophyllin, which is water-soluble and stable in low pH aqueous foods.

It is another object of the invention to provide new coloring compositions suitable for use in dry mix compositions for preparing acidic beverages and foods such as gelatin desserts.

It is another object of the invention to provide new dry mix compositions for preparing acidic beverages and foods, such as gelatin desserts, and methods for preparing them.

These and other objects are achieved by the present invention, which provides: a dry, water-soluble green coloring composition, which is stable in low pH aqueous foods; a method for making the new coloring composition; and new dry mix compositions for preparing acidic beverages and foods, such as gelatin desserts, and methods for preparing the new dry mix compositions.

In one aspect, the invention provides a dry, water-soluble, acid-stable green coloring composition comprising copper chlorophyllin, solid fixative and a hydrophilic surfactant, the weight ratio of the copper chlorophyllin to the hydrophilic surfactant being in the range of from about 1:1 to about 1:6.

Many of the preferred aspects of the invention are described below.

INDUSTRIAL APPLICABILITY

The following description will illustrate the preparation of preferred products of the invention to provide the person skilled in the art with the information necessary to make these products as well as variations of them using equivalent materials and methods.

The copper chlorophyllin compositions of the invention are acid-stable and cold-water-soluble and provide a desirable green color that is non-staining. The new compositions are in the form of a dry, free-flowing powder that wets easily and dissolves rapidly and completely in aqueous liquids having acid pH values suitable for fruity-flavored beverages and foods such as gelatin desserts. The pH values of principal concern are below 4, e.g., from about 2.5 to about 3.5. The compositions of the invention comprise copper chlorophyllin, a solid fixative and a hydrophilic surfactant, the weight ratio of the copper chlorophyllin and the hydrophilic surfactant being in the range of from about 1:1 to 1:6. It is a surprising finding of the invention that low levels of emulsifier improve solubility and dispersibility of the product.

To assure that the surfactant is readily dispersible in water, especially at the pH conditions intended, it will preferably be hydrophilic, having an HLB of at least about 10, and most preferably of at least about 12, e.g., from about 14 to about 18. Among the suitable surfactants are polysorbate 20, polyoxyethylene (20) sorbitan monolaurate; polysorbate 60, polyoxyethylene (20) sorbitan monostearate; polysorbate 80, polyoxyethylene (20) sorbitan monooleate; polysorbate 65, polyoxyethylene (20) sorbitan tristearate; sodium dodecyl sulfate; and DOSS (dioctyl sodium sulphosuccinate).

The compositions of the invention will, in addition to being dry, water-soluble and acid stable, be free-flowing powders. To make them most useful in the widest variety of food applications, the powders are characterized by a number of important physical properties. The powder should flow well in mixing and measuring equipment, being free from clumping or agglomeration. It should also disperse readily to aid in rapid and complete dissolution. Further, it should be relatively non-hygroscopic, so that it won't attract moisture that could reduce its flow properties or those of a dry mix including it.

To achieve these properties, it is necessary to select a suitable solid fixative, typically a carbohydrate such as a gum (including natural, modified and synthetic gums, such as carboxymethyl cellulose, vegetable gums such as locust bean gum, carob bean gum, guar gum, carrageenans and alginates and various starches and modified starches), suitable proteinaceous materials such as gelatin, casein, and whey protein concentrate, sugars, dextrins or a combination of two or more of these. Tests indicate that the use of gums at a level of from about 0.002 to about 0.01 %, based on the final beverage mix prepared with the coloring composition of the invention can cause a desirable shift in hue to the more yellowish.

The term "sugar" is to be understood as meaning any of a number of useful saccharide materials. Included in the list of useful sugars are the mono-saccharides, di-saccharides and polysaccharides and their degradation products; e.g., pentoses, including aldopentoses, methylpentoses, ketopentoses, like xylose and arabinose; a deoxyaldose like rhamnose, hexoses and reducing saccharides such as aldo hexoses like glucose, galactose and mannose; the ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides. A number of sugar syrups, including corn syrup, high fructose corn syrup, molasses, and the like, are common sources as are various granular and powdered forms.

Highly preferred solid fixatives are low sweetness sugars such as maltose. Especially useful are high maltose corn syrups such as sold under the Satin Sweet brand by Cargill, Inc. (Minneapolis, Minn.), which is 81 % solids, of which 65% is maltose, 3% is dextrose and 20% is higher saccharides. Another suitable material is a maltodextrin powder, marketed under the brand Lodex-10 by American Maize Co. (Hammond, IN), having a dextrose equivalent (DE) of about 10, a particle size of about 300 microns and a moisture content of less than 5%.

The dry, water-soluble, acid-stable green coloring compositions of the invention are prepared by drying an aqueous solution of the copper chlorophyllin, the surfactant and the solid fixative. Drying will preferably be done by spray drying, but other methods such as drum drying, vacuum drying, freeze drying and the like can be employed, if desired. When spray drying is employed, the amount of surfactant should be carefully controlled to within the range as noted above. Preferably the weight ratio of the copper chlorophyllin to the hydrophilic surfactant being in the range of from about 1:1 to 1:6. Ratios of from about 1:2 to about 1:4 are preferred. The final product density should be at least about 0.25, and preferably at least about 0.30 grams per cubic centimeter to permit efficient recovery of product following drying. Particle size, as measured by light scanning (Galai Instruments, Inc., Model # CIS-100) and expressed as a weight median value, is preferably within the range of about 20 to about 100 micrometers.

To prepare a dry mix composition for preparing an acidic beverage by mixing with water, the dry green coloring composition of the invention is mixed in dry form with flavor and sufficient acid to achieve a beverage pH of less than 4 (e.g., from about 2.5 to about 3.5) when the dry mix composition is mixed with water. Any suitable dry blender can be employed, such as a V-blender or a ribbon mixer. Any of the suitable food acidulents can be employed, e.g., adipic acid, citric acid, fumaric acid, lactic acid, malic acid (e.g., dl malic), tartaric acid, and mixtures of at least two of these. In some cases it is desirable to add a buffering salt compatible with the other ingredients, particularly the acid components, such as a member selected from the group consisting of the sodium and potassium salts of the listed food acids. Among the specific useful weak acid salts are sodium citrate, potassium citrate, disodium phosphate, dipotassium phosphate, and mixtures of at least two of these. Sodium citrate is preferred for most formulations, but the potassium salts are preferred for low-sodium formulations. Also useful in some cases are flow control ingredients such as magnesium oxide or phosphate salts, e.g., tricalcium phosphate, monocalcium phosphate and dicalcium phosphate. Tests show that the use of magnesium oxide is preferred to tricalcium phosphate in some formulations.

For some beverage mixes, it is desired to blend in sugar or an intense sweetener prior to packaging. The type of sugar will depend on a number of factors, but is typically sucrose. High intensity sweeteners will be used in like proportion to sucrose, based on their relative sweetness values. Among the intense sweeteners are aspartame, acesulfame-K, saccharin, cyclamate, neohesperidin dihydrochalcone, thaumatin, sucralose, altame, stevioside, glycyrrhzin, Lo Han Guo, and the like. Also, low-intensity, low-calorie sweeteners such as sorbitol and erythritol can be employed. When a high intensity sweetener is employed, it may also be desired to add a bulking agent.

The green coloring composition of the invention can also be dry blended with suitable ingredients for making a dry mix composition for preparing acidic gelatin desserts. The process entails blending in dry form, gelatin, the coloring composition, flavor and sufficient acid to achieve a product pH of less than 4 when the dry mix composition is mixed with water.

In the preparation of each of these exemplary food products, it is sometimes desirable to prepare a premix of two or more of the ingredients either by dry blending, codrying or agglomeration. Indeed, it is sometimes useful to agglomerate the finished composition to make it more easily pourable, more wetable and less dusting.

Once blended, the mixes can be packaged in conventional fashion. For the beverage mixes, a poly-foil pouch is typical. For the gelatin dessert mix, a poly bag in a box is preferred. However, to achieve the best operation of the packaging equipment, it will be preferred to obtain a particle size of at least about 160 micrometers and a density of at least about 0.60 grams per cubic centimeter.

The following Examples are provided to further illustrate and explain a preferred form of the invention and is not to be taken as limiting in any regard. Unless otherwise indicated, all parts and percentages are by weight.

EXAMPLE 1

A number of samples of dry, green coloring compositions based on copper chlorophyllin were prepared by preparing an aqueous blend of the noted ingredients in water. In all cases except run 3, the solids concentration was 40%. For run 3, the solids concentration was reduced to 30%. The solutions were spray dried at an air inlet temperature of 120° C. Several evaluations were made of the materials, as summarized in Table 1.

TABLE 1

| Run | WT PS[1]: SCC[2] | Solids | (% Dry) | Density (g/cc) | Particle Size (mμ) | Drying % Yield | Solubility |
|---|---|---|---|---|---|---|---|
| 1 | 8:1 | PS | 35.6 | 0.28 | — | 29.0 c[6] | Insoluble |
|   |     | SCC | 4.4 |   |   | 71.3 t[7] |   |
|   |     | MD[3] | 60 |   |   |   |   |
| 2 | 8:1 | PS | 26.7 | 0.32 | — | 48.9 c | Insoluble |
|   |     | SCC | 3.3 |   |   | 58.5 t |   |
|   |     | MD | 70 |   |   |   |   |
| 3 | 8:1 | PS | 35.6 | 0.26 | 62.8 | 35.9 c | Insoluble |
|   |     | SCC | 4.4 |   |   | 58.1 t |   |
|   |     | MD | 60 |   |   |   |   |
| 4 | 8:1 | PS | 26.4 | 0.28 | — | 26.7 c | Insoluble |
|   |     | SCC | 3.3 |   |   | 62.7 t |   |
|   |     | MD | 23.4 |   |   |   |   |
|   |     | HMCS[4] | 46.9 |   |   |   |   |
| 5 | 6:1 | PS | 19.8 | 0.30 | 60.0 | 58.7 c | Slightly |
|   |     | SCC | 3.3 |   |   | 77.9 t | Insoluble |
|   |     | MD | 25.7 |   |   |   |   |
|   |     | HMCS | 51.2 |   |   |   |   |
| 6 | 4:1 | PS | 15.4 | 0.34 | 80.0 | 79.2 c | OK |
|   |     | SCC | 3.8 |   |   | 79.2 t |   |
|   |     | MD | 27 |   |   |   |   |
|   |     | HMCS | 53.8 |   |   |   |   |
| 7 | 4:1 | PS | 15.4 | 0.27 | 76.7 | 85.0 t | OK |
|   |     | SCC | 3.8 |   |   |   |   |
|   |     | MD | 27 |   |   |   |   |
|   |     | HMCS | 53.8 |   |   |   |   |
| 8 | 2:1 | PS | 7.7 | 0.40 | 70.3 | 76.2 c | OK |
|   |     | SCC | 3.8 |   |   | 82.8 t |   |
|   |     | MD | 29.5 |   |   |   |   |
|   |     | HMCS | 59 |   |   |   |   |
| 9 | 2:1 | PS | 7.7 | 0.46 | — | 79.5 c | OK |
|   |     | SCC | 3.8 |   |   | 82.1 t |   |
|   |     | MD | 29 |   |   |   |   |
|   |     | HMCS | 58 |   |   |   |   |
|   |     | AF[5] | 1.5 |   |   |   |   |
| 10 | 0:1 | SCC | 3.8 | 0.54 | — | 77.9 c | Insoluble |
|   |     | MD | 32.1 |   |   | 80.5 t |   |
|   |     | HMCS | 64.1 |   |   |   |   |

[1]Polysorbate 60
[2]Sodium Copper Chlorophyllin
[3]Maltodextrin Powder (Lodex 10 brand by American Maize Co., Hammond, IN)
[4]High Maltose Corn Solids (Satin Sweet brand by Cargill, Inc., Minneapolis, MN)
[5]Anti Foam (Mazol brand by PPG Industries)
[6]In cup yield (c), determined by weight recovery.
[7]Total yield (t), both wall and cup.

EXAMPLE 2

A stock solution of 4.17 grams of 97% sodium copper chlorophyllin powder (3% moisture) and 100 grams of spring water is made by mixing at between 118° F. and 140° F. for three minutes using a Lightnin™ mixer. While this solution continues to mix, 12.51 grams of sodium dodecyl sulfate (SDS) is added, so that the SDS is at a 3:1 ratio to the copper chlorophyllin. The combination is allowed to continue mixing for an additional three minutes. The result is a concentrated dark green color solution, which is identified below as the SDS solution and is mixed with the ingredients noted below in Table 2. A similar solution was prepared without the SDS and is identified below as the control solution.

TABLE 2

| Ingredient | Control | Formula of Invention |
|---|---|---|
| Granulated Sucrose | 100 grams | 100 grams |
| Kiwi Lime Base with Flavor and Citric Acid | 2.5 grams | 2.5 grams |
| Spring Water | 913 grams | 913 grams |
| SDS Solution | 0 | 0.28 grams |
| Control Solution | 0.25 grams | 0 |

The pH of the resulting beverages was about 2.95. The results showed that the color precipitated in the control beverage while the one using the SDS provided a clear green beverage.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. A dry, water-soluble, acid-stable green coloring composition comprising copper chlorophyllin, a solid fixative and a hydrophilic surfactant, the weight ratio of the copper chlorophyllin to the hydrophilic surfactant being in the range of from about 1:1 to 1:6.

2. A dry, water-soluble, acid-stable green coloring composition according to claim 1, wherein the solid fixative is a member selected from the group consisting of a gum, a proteinaceous material, a sugar, a dextrin and a combination of two or more of these.

3. A dry, water-soluble, acid-stable green coloring composition according to claim 1, wherein the surfactant has an HLB of at least about 10.

4. A dry, water-soluble, acid-stable green coloring composition according to claim 1, wherein the color is stable in water at a pH of less than about 4.

5. A dry, water-soluble, acid-stable green coloring composition according to claim 4, wherein the color is stable in water at a pH of 2.5.

6. A dry, water-soluble, acid-stable green coloring composition according to claim 1, wherein the composition further includes an anti-foam ingredient.

7. A dry, water-soluble, acid-stable green coloring composition according to claim 1, wherein the composition is in the form of a free flowing dry powder having a density of at least about 0.25 grams per cubic centimeter.

8. A dry, water-soluble, acid-stable green coloring composition according to claim 1, wherein the weight ratio of the copper chlorophyllin to the hydrophilic surfactant is in the range of from about 1:2 to 1:4.

9. A dry, water-soluble, acid-stable green coloring composition according to claim 1, wherein the surfactant comprises a member selected from the group consisting of polyoxyethylene (20) sorbitan monolaurate; polyoxyethylene (20) sorbitan monostearate; polyoxyethylene (20) sorbitan monooleate; polyoxyethylene (20) sorbitan tristearate; sodium dodecyl sulfate; dioctyl sodium sulphosuccinate and mixtures of two or more of these.

10. A method for making a dry, water-soluble green coloring composition, which is stable in low-pH, aqueous foods, comprising:

mixing water, copper chlorophyllin, a solid fixative and a hydrophilic surfactant, the weight ratio of the copper chlorophyllin to the hydrophilic surfactant is in the range of from about 1:1 to 1:6; and drying the resulting mixture.

11. A method for making a dry, water-soluble green coloring composition, which is stable in low-pH, aqueous foods, according to claim 10, wherein the mixture is spray dried.

12. A method for making a dry, water-soluble green coloring composition, which is stable in low-pH, aqueous foods, according to claim 10, wherein the mixture includes an anti-foam ingredient.

13. A method for making a dry, water-soluble green coloring composition, which is stable in low-pH, aqueous foods, according to claim 10, wherein the mixture is dried to provide a free-flowing powder having a density of at least about 0.25 grams per cubic centimeter.

14. A method for making a dry, water-soluble green coloring composition, which is stable in low-pH, aqueous foods, according to claim 10, wherein the weight ratio of the copper chlorophyllin and the hydrophilic surfactant is in the range of from about 1:2 to 1:4.

15. A dry mix composition for preparing an acidic foodstuff by mixing with water, comprising: a dry, water-soluble, acid-stable green coloring composition comprising copper chlorophyllin, a solid fixative and a hydrophilic surfactant, the weight ratio of the copper chlorophyllin to the hydrophilic surfactant being in the range of from about 1:1 to 1:6; flavor and sufficient acid to achieve a prepared foodstuff pH of less than 4 when the dry mix composition is mixed with water.

16. A dry mix composition according to claim 15, wherein the green coloring composition is in the form of a dry free-flowing powder having a density of at least about 0.25 grams per cubic centimeter.

17. A dry mix composition according to claim 15, wherein the weight ratio of the copper chlorophyllin to the hydrophilic surfactant is in the range of from about 1:2 to 1:4.

* * * * *